(12) United States Patent
Aftab et al.

(10) Patent No.: US 11,611,487 B2
(45) Date of Patent: *Mar. 21, 2023

(54) MODEL DRIVEN PROCESS FOR AUTOMATED DEPLOYMENT OF DOMAIN 2.0 VIRTUALIZED SERVICES AND APPLICATIONS ON CLOUD INFRASTRUCTURE

(71) Applicant: AT&T Intellectual Property I, L.P., Atlanta, GA (US)

(72) Inventors: Syed Anwar Aftab, Budd Lake, NJ (US); Rittwik Jana, Montville, NJ (US); John F. Murray, Denville, NJ (US); Mazin E. Gilbert, Warren, NJ (US); Kazi Farooqui, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,741

(22) Filed: Nov. 30, 2021

(65) Prior Publication Data

US 2022/0086055 A1    Mar. 17, 2022

Related U.S. Application Data

(63) Continuation of application No. 15/090,057, filed on Apr. 4, 2016, now Pat. No. 11,223,536.

(51) Int. Cl.
*G06F 15/16* (2006.01)
*H04L 41/14* (2022.01)
(Continued)

(52) U.S. Cl.
CPC ........ *H04L 41/145* (2013.01); *H04L 41/0856* (2013.01); *H04L 41/5054* (2013.01);
(Continued)

(58) Field of Classification Search
CPC ............... H04L 41/145; H04L 41/0856; H04L 67/1097
(Continued)

(56) References Cited

U.S. PATENT DOCUMENTS

| 7,577,722 B1 | 8/2009 | Khandekar et al. |
| 8,261,295 B1 | 9/2012 | Risbood et al. |

(Continued)

FOREIGN PATENT DOCUMENTS

| CN | 102314358 B | 2/2014 |
| CN | 103605570 A | 2/2014 |

(Continued)

OTHER PUBLICATIONS

"VMware Cloud Management: Insights into managing your datacenter", VMWare®? Biogs, blogs.vmware.com, https://blogs.vmware.com/management/2013/01, Jan. 2, 2013, 4 pages.

(Continued)

*Primary Examiner* — Dustin Nguyen
*Assistant Examiner* — Joel Mesa
(74) *Attorney, Agent, or Firm* — Guntin & Gust, PLC; Ralph Trementozzi

(57) ABSTRACT

A model-driven system automatically deploys a virtualized service, including multiple service components, on a distributed cloud infrastructure. A master service orchestrator causes a cloud platform orchestrator to retrieve a cloud services archive file, extract a cloud resource configuration template and create cloud resources at appropriate data centers as specified. The master service orchestrator also causes a software defined network controller to retrieve the cloud services archive file, to extract a cloud network configuration template and to configure layer 1 through layer 3 virtual network functions and to set up routes between them. Additionally, the master service orchestrator causes an application controller to retrieve the cloud services archive (Continued)

file, to extract a deployment orchestration plan and to configure and start layer 4 through layer 7 application components and bring them to a state of operational readiness.

20 Claims, 5 Drawing Sheets

(51) Int. Cl.
    *H04L 67/1097* (2022.01)
    *H04L 41/0853* (2022.01)
    *H04L 41/5054* (2022.01)
    *H04L 41/50* (2022.01)
    *H04L 41/084* (2022.01)

(52) U.S. Cl.
    CPC ...... *H04L 67/1097* (2013.01); *H04L 41/0843* (2013.01); *H04L 41/5077* (2013.01)

(58) Field of Classification Search
    USPC .......................................................... 709/226
    See application file for complete search history.

(56) References Cited

U.S. PATENT DOCUMENTS

| | | | |
|---|---|---|---|
| 8,645,529 B2 | 2/2014 | Doddavula | |
| 8,997,078 B2 | 3/2015 | Spivak et al. | |
| 9,047,133 B2 | 6/2015 | Winterfeldt et al. | |
| 9,063,746 B2 | 6/2015 | Yousouf et al. | |
| 9,083,608 B2 | 7/2015 | Heninger et al. | |
| 9,208,184 B1 | 12/2015 | Ukeda | |
| 2010/0106812 A1 | 4/2010 | Bernabeu-auban et al. | |
| 2011/0214124 A1 | 9/2011 | Ferris et al. | |
| 2012/0233668 A1* | 9/2012 | Leafe ................. | G06F 9/44526 726/4 |
| 2013/0232470 A1 | 9/2013 | Yung | |
| 2014/0026131 A1 | 1/2014 | Ravi | |
| 2014/0196022 A1 | 7/2014 | Skutin et al. | |
| 2014/0280484 A1 | 9/2014 | Klemenz et al. | |
| 2014/0325503 A1 | 10/2014 | Li | |
| 2015/0020063 A1 | 1/2015 | Li et al. | |
| 2015/0163288 A1 | 6/2015 | Maes et al. | |
| 2015/0180949 A1 | 6/2015 | Maes et al. | |
| 2015/0295781 A1* | 10/2015 | Maes ................... | G06F 9/5072 715/735 |
| 2015/0331758 A1 | 11/2015 | Durge et al. | |

FOREIGN PATENT DOCUMENTS

| | | |
|---|---|---|
| CN | 102646062 B | 4/2014 |
| CN | 104123141 A | 10/2014 |
| CN | 102904955 B | 11/2015 |
| WO | 2014190544 A1 | 12/2014 |
| WO | 2015065382 A1 | 5/2015 |
| WO | 2015065389 A1 | 5/2015 |

OTHER PUBLICATIONS

Edwards, Damon et al., "Web Ops 2.0: Achieving Fully Automated Provisioning", dev2ops, puppetlabs.com, Ver. 1.1, Aug. 15, 2009, 10 pages.
Hubbard, Stan , "White Paper: Automating Carrier Ethernet 2.0 Service Delivery & Preparing for SDNEnabled Services", Heavy Reading, Transition Network, transition.com, Sep. 2013, 12 pages.
Li, Juan et al., "Multi-Cloud Governance Service based on Model Driven Policy Generation", Closer; http://liris.cnrs.fr/Documents/Liris6125.pdf, 2013, 10 pages.
Nhan, Tam L., "ModelDriven Software Engineering for Virtual Machine Images Provisioning in Cloud Computing", Diss. Universite Rennes 1, 2013, https://hal.archivesouvertes.fr/docs/00/92/38/11/PDF/PhDThesisLeNhanTam.pdf, 2013, 129 pages.

* cited by examiner

MODEL DRIVEN PROCESS FOR AUTOMATED DEPLOYMENT OF DOMAIN 2.0 VIRTUALIZED SERVICES AND APPLICATIONS ON CLOUD INFRASTRUCTURE

CROSS-REFERENCE TO RELATED APPLICATIONS

This application is a continuation of U.S. application Ser. No. 15/090,057, filed Apr. 4, 2016. All sections of the aforementioned application(s) and/or patent(s) are incorporated herein by reference in their entirety.

TECHNICAL FIELD

Embodiments of the present disclosure relate to virtualized services in a cloud computing environment. Specifically, the disclosure relates to the automatic deployment of virtualized services using a model driven cloud service designer tool.

BACKGROUND

Virtualization technologies have sufficiently matured in recent years to permit commercial offerings of cloud platforms, such as the AT&T Integrated Cloud (AIC®), Amazon's AWS®, etc. The deployment of cloud applications on those platforms is an ad-hoc, manual process with no well-defined methodology. There is no single, centralized end-to-end procedure to guide the overall application deployment across disparate infrastructures—cloud infrastructure, network infrastructure, application hosing infrastructure, data collection and policy infrastructure.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
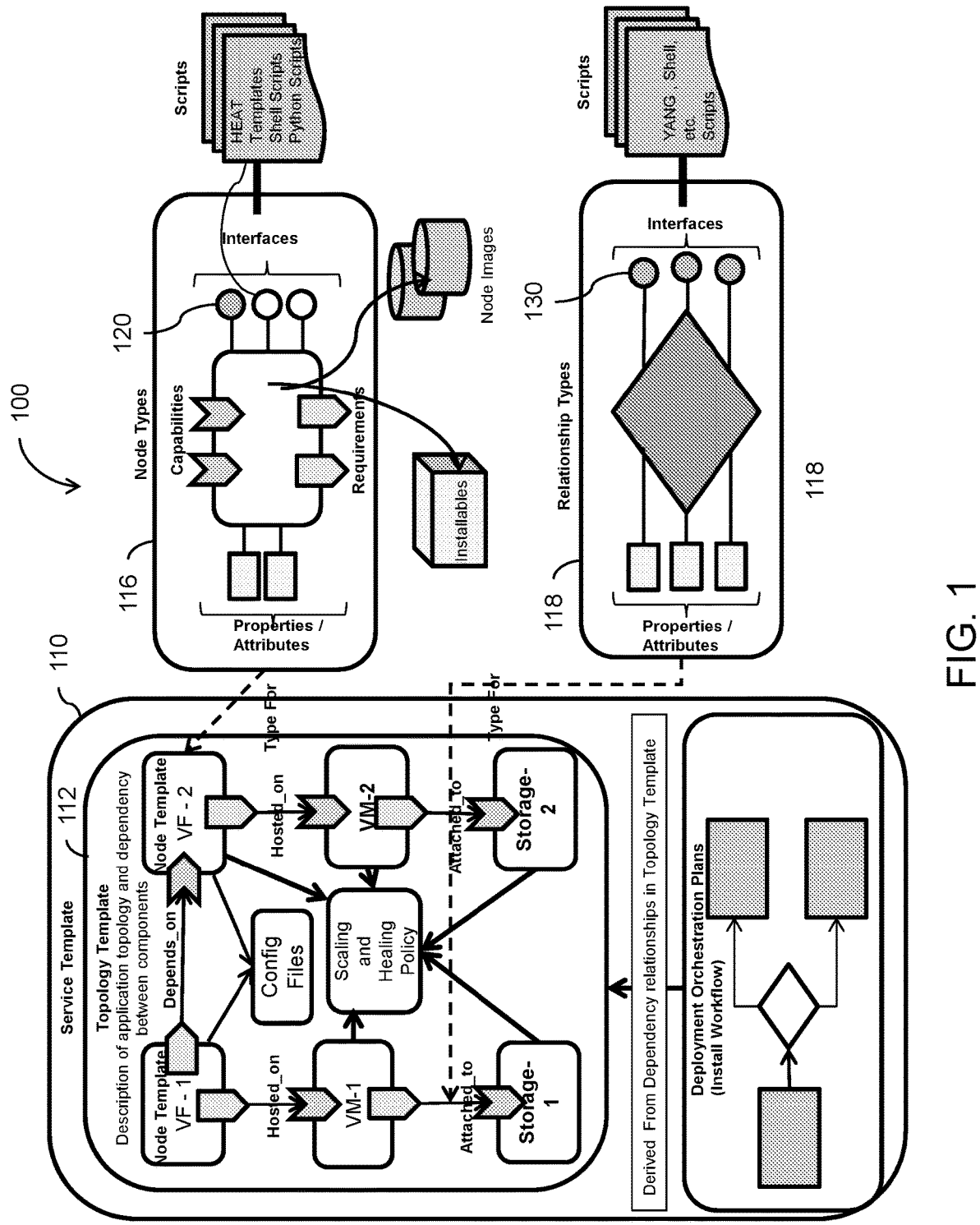
FIG. 1 is a diagrammatic representation of process for generating cloud service design templates such as those used in accordance with aspects of the present disclosure.

Presently disclosed is a topology model-driven automated deployment process for deploying multi-component cloud applications or services on cloud platforms. Specifically, in a topology deployment pipeline, a topology model of the application results in the generation of an application-dependency graph (A-DG) that is the basis for creating multiple artifacts, including deployment orchestration plans, HEAT templates (an OpenStack™ template format used in cloud provisioning) and YANG templates (a NETCONF™ modeling language used in network provisioning).

Several basic concerns of cloud deployment are addressed by the disclosure, such as cloud infrastructure, network and application aspects. The disclosed deployment automation process uses a series of steps performed using the operator's cloud automation framework. In particular, the framework components work together in deploying a composite virtualized service (also referred as a distributed application) on a distributed infrastructure spanning multiple clouds (data centers) and spanning across networks.

The current state of cloud service deployment on cloud platforms is ad hoc, with no well-defined methodology. Typically, the process comprises manual handovers from one automated step to another. There is no single centralized end-to-end automation to guide the overall application deployment across disparate infrastructures—cloud infrastructure, network infrastructure, and application hosting infrastructure. Importantly, there is no model driven (i.e., service topology driven) deployment.

Presently disclosed is a single centralized automation process that is based on a service topology model such as that described in the Topology and Orchestration Specification for Cloud Applications (TOSCA™) standard developed by the OASIS consortium. The topology model describes the components of the application, and the relationship (or dependencies) between those components, such as if one component depends upon the availability of another component, or is required to be hosted on another component. The deployment orchestration plan is derived from the topology model. Runtime data collection and policies that must be instantiated or enforced are also obtained from the overarching TOSCA model.

The single, centralized deployment plan then drives each aspect of the end-to-end application deployment process, including creating cloud infrastructures required for the application, connecting the remote infrastructure components and configuring their connectivity, and setting up, configuring and starting the application, thus bringing the application up to a state of operational readiness. The cloud, the network and the application aspects of deployment are thus tightly integrated by a detailed interaction sequence between components of the network operator's cloud operations automation framework. Described below is a set of steps used according to aspects of the disclosure to perform cloud application deployment on cloud platforms.

The techniques of the present disclosure leverage the virtualization of the compute and network elements by configuring them with a common set of protocols (e.g., TOSCA, YANG, HEAT, etc.). The service is auto-provisioned through a central orchestration mechanism that instructs the southbound platform, application and network controllers to perform their corresponding functions.

Embodiments of the present disclosure include a system for provisioning a virtualized service in a cloud infrastructure. The system includes an order repository data store containing a cloud services archive file describing the virtualized service and generated by a cloud service designer tool, the cloud services archive file including an order ID associating it with the virtualized service.

The system additionally includes a master service orchestrator comprising: a cloud platform orchestrator interface for transmitting cloud resource configuration instructions including the order ID to a cloud platform orchestrator to cause the cloud platform orchestrator to retrieve the cloud services archive file from the order repository data store using the order ID, to extract a cloud resource configuration template from the cloud services archive file and to create cloud resources at appropriate data centers as specified by the cloud resource configuration template; a software defined network controller interface for transmitting cloud network configuration instructions including the order ID to a software defined network controller to cause the software defined network controller to retrieve the cloud services archive file from the order repository data store using the order ID, to extract a cloud network configuration template from the cloud services archive file and to configure layer I through layer 3 virtual network functions and to set up routes between the cloud resources as specified by the cloud network configuration template; and an application controller interface for transmitting deployment orchestration instructions including the order ID to an application controller to cause the application controller to retrieve the cloud services archive file from the order repository data store using the order ID, to extract a deployment orchestration plan from the cloud services archive file and to configure layer 4 through layer 7 application components as specified by the deployment orchestration plan and to start the application components.

Further embodiments of the disclosure include a method for provisioning a virtualized service in a cloud infrastructure. A cloud services archive file describing topology and network requirements of the virtualized service is generated. The services archive file is stored in an order repository data store with an order ID associating the services archive file with the virtualized service.

A master service orchestrator then transmits cloud resource configuration instructions including the order ID to cause a cloud platform orchestrator to retrieve the cloud services archive file from the order repository data store using the order ID, to extract a cloud resource configuration template from the cloud services archive file and to create cloud resources at appropriate data centers as specified by the cloud resource configuration template. The master service orchestrator also transmits cloud network configuration instructions including the order ID to cause a software defined network controller to retrieve the cloud services archive file from the order repository data store using the order ID, to extract a cloud network configuration template from the cloud services archive file and to configure layer I through layer 3 virtual network functions and to set up routes between the cloud resources as specified by the cloud network configuration template. The master service orchestrator additionally transmits deployment orchestration instructions including the order ID to cause an application controller to retrieve the cloud services archive file from the order repository data store using the order ID, to extract a deployment orchestration plan from the cloud services archive file and to configure layer 4 through layer 7 application components as specified by the deployment orchestration plan and to start the application components.

In further embodiments of the disclosure, a computer-readable storage device has stored thereon computer readable instructions for provisioning a virtualized service in a cloud infrastructure. Execution of the computer readable instructions by a processor causes the processor to perform operations comprising: receiving from a service design and composition tool, a cloud services archive file describing topology and network requirements of the virtualized service; storing the services archive file in an order repository data store with an order ID associating the services archive file with the virtualized service; transmitting cloud resource configuration instructions including the order ID to cause a cloud platform orchestrator to retrieve the cloud services archive file from the order repository data store using the order ID, to extract a cloud resource configuration template from the cloud services archive file and to create cloud resources at appropriate data centers as specified by the cloud resource configuration template; transmitting cloud network configuration instructions including the order ID to cause a software defined network controller to retrieve the cloud services archive file from the order repository data store using the order ID, to extract a cloud network configuration template from the cloud services archive file and to configure layer I through layer 3 virtual network functions and to set up routes between the cloud resources as specified by the cloud network configuration template; and transmitting deployment orchestration instructions including the order ID to cause an application controller to retrieve the cloud services archive file from the order repository data store using the order ID, to extract a deployment orchestration plan from the cloud services archive file and to configure layer 4 through layer 7 application components as specified by the deployment orchestration plan and to start the application components.

The presently disclosed systems and methods are for deploying a cloud service composed of multiple service components described in a modeling language such as TOSCA The cloud service is deployed in an integrated cloud environment using runtime orchestrators and controllers in a cloud provider's cloud automation framework. In one example, the cloud service is deployed in the AT&T AIC using the AT&T Enhanced Control, Orchestration, Management, and Policy (ECOMP) framework, and, in particular, using a master service orchestrator (MSO) such as the AT&T MSO, a cloud platform orchestrator such as the AIC-platform orchestrator (AIC-PO), a software defined network-controller (SDN-C), an application controller (APP-C), and a runtime inventory component. A complete interaction sequence is described below as a step-by-step process setting forth how the proposed cloud automation framework components work together in deploying cloud applications on a virtualized cloud infrastructure.

Various artifacts are generated from the TOSCA topology specification of the cloud service (or cloud application). These artifacts are used by different cloud automation platform orchestrators and controllers to deploy the application on the integrated cloud. The artifacts are used in a sequence of interactions that occur between the cloud automation platform orchestrators and controllers in order to deploy the cloud application. In the present disclosure, the terms service and application are used interchangeably—both are composed from multiple components.

The topology specification of a telecom application or service is created using service, design and creation tools such as the AT&T Service Design and Creation (ASDC) Tools. Those tools include TOSCA editors and service composers and validators. The topology specification is the basis from which many other artifacts are generated. Those artifacts are used by the master service orchestrator (MSO) to coordinate the overall service deployment. The cloud platform orchestrator uses the artifacts to set up the cloud infrastructure, including virtual machines (VMs), virtual network interface connections (vNICs) and subnets. The artifacts are used by the SDN-C to establish connectivity between remote infrastructures and set up route and bandwidth. The artifacts are used by the APP-C to configure and start the application components deployed on those infrastructures.

In the present disclosure, the OASIS TOSCA™ modeling language, together with related standards such as HEAT™ and YANG™, are used in describing exemplary embodiments. One skilled in the art will recognize that other specifications for describing the topology and orchestration of cloud applications may be used without departing from the scope or spirit of the disclosure.

A TOSCA service model may be created from individual resources in a proprietary service design and creation tool such as ASDC. The resources each have their own capabilities, requirements, properties, attributes and lifecycle management operations. The recipe for a service is created and sent to the MSO in the form of a TOSCA blueprint. The MSO is a TOSCA interpreter that parses the TOSCA specification and eventually instructs the controllers to perform their corresponding functions. Those functions include at least (1) the creation of VMs by the infrastructure controller, (2) the creation of networks and subnets by the SDN controller, and (3) the deployment and configuration of application components by the application controller. Those controllers require their specific protocols and files. As a result, converters are needed to adapt the instructions in their respective protocol (e.g., YANG, HEAT, DG, etc.). At run-time, the TOSCA orchestrator also requests for the DCAE monitoring and analytics modules to be started to monitor the state of the VM and the application components. The DCAE collectors route the monitored information to an analytics module for post processing. Decisions are made by consulting the policy framework in a closed loop fashion. Finally, the policy engine enforces the necessary rules to be applied by means of the MSO or to the individual controllers directly.

An exemplary OASIS TOSCA template, used in accordance with exemplary embodiments of the invention, is described here with reference to the block diagram 100 of FIG. 1. The TOSCA template is a bundle of related files including the following:

A service topology specification 110 may be written in Y AML™ human-readable data serialization language. The topology specification is the basis for the generation of the application-dependency graph. The service topology specification 110 includes a topology template 112, node types 116 and relationship types 118.

Individual node lifecycle interfaces 120 may be Shell™ or Python™ scripts or may be instantiated using Chef™ or Puppet™ configuration management utilities. In embodiments, the operations in the node lifecycle interface are called by commands including:

Create( ) is used to create VM, etc. Nodes—(for example, called by OpenStack-HEAT-NOVA to create a VM).

Install( ) is used to install a VF in a container—(for example, called by OpenStack-HEAT-GLANCE to install a VF on a VM).

Configure( ) is used to configure VFs—(for example, called by APP-C to configure a VF).

Start( ) Node is used to start a VF—(For example, called by APP-C to start a VF).

Stop( ) Node, etc.

Relationship lifecycle interfaces 130 may be written in YANG, Ruby. In embodiments, the operations in the relationship lifecycle interface may be called by commands including:

Connect( ) (for example, called by SDN-C to set up the route on WAN links between remote VFs).

Configure( ) is used to configure L1-L3 VF properties—(for example, called by SDN-C to configure bandwidth, jitter, latency, CoS/QoS, etc. on the WAN links between remote VFs).

Disconnect( ) used to tear down a route.

The TOSCA template may also include files defining deployment-related policies, such as a healing policy that defines what action to take when a VM crashes (such as create a new VM at the same site—but different availability zone); and a scaling policy that defines what action to take when a VF is overloaded (such as create a new VM, install VF on the new VM, re-direct traffic to new VF).

Also included in the TOSCA template are configuration files written in YANG, Chef I Puppet. The configuration files may configure L1-L3 application components via YANG/Netconf, and may configure L4-L7 application components via SSH, Chef/Puppet, etc.

Deployment plans may also be included in the TOSCA template. Those are plans to deploy the application and its topology on cloud platform. The plans may be written in business process model and notation (BPMN) 2.0 or even Python. These workflows orchestrate/call the cloud platform orchestrator, SDN-C, and APP-C controllers. The deployment plans include install workflows, un-install workflows and healing and scaling workflows.

The TOSCA template is packaged together in a zipped archive file called a Cloud Services Archive File (CSAR).

Figure 2:
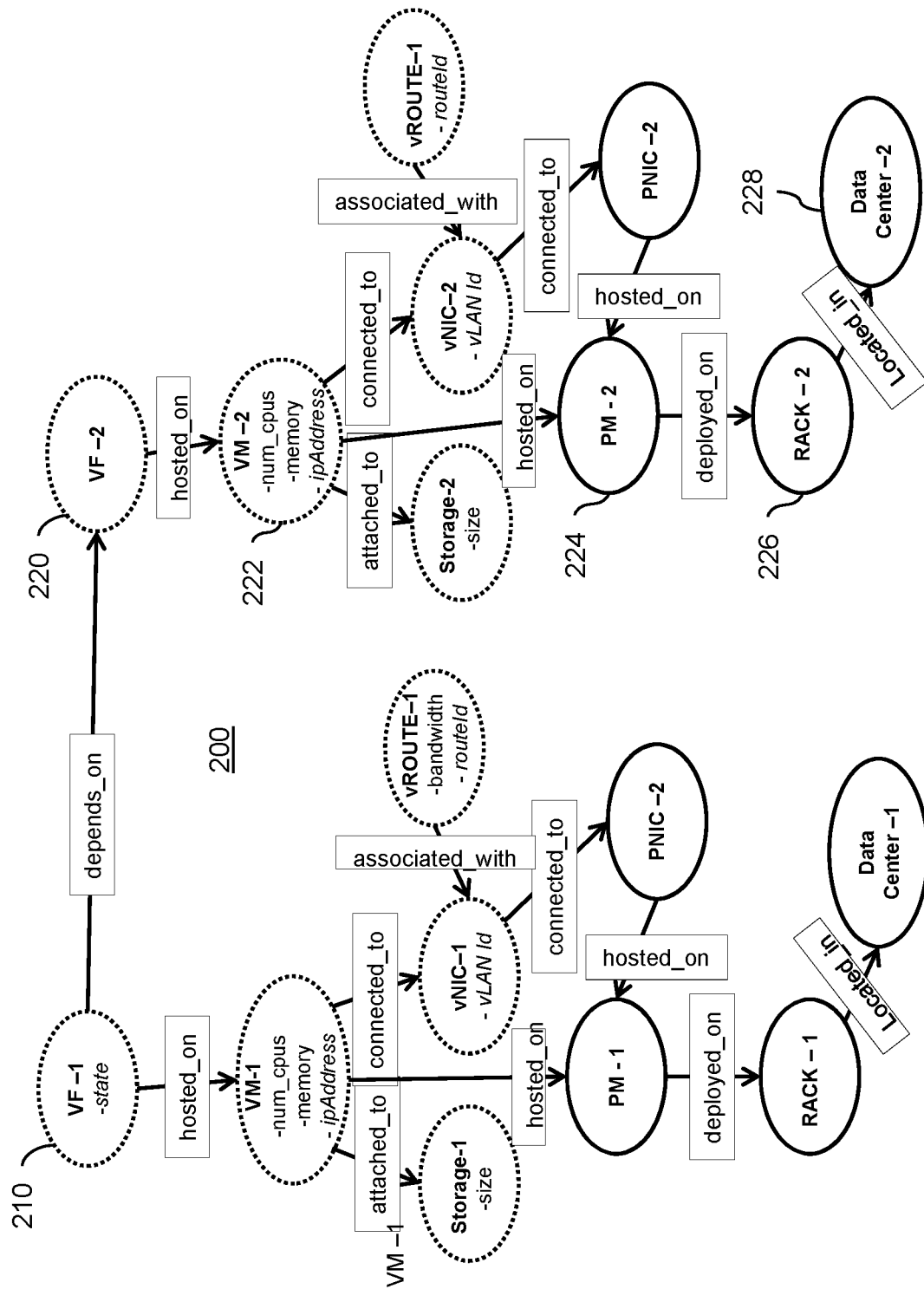
FIG. 2 is an example dependency graph of a virtualized cloud service representative of cloud services deployed in accordance with aspects of the present disclosure.

An application-dependency graph (A-DG), such as the graph 200 shown in FIG. 2, is used in representing application topology and dependency between components in a TOSCA template. The graph 200 depicts a virtual function 210 that is dependent on a virtual function 220. Dependencies between nodes are shown as solid arrows labeled with the attributes of the dependencies. Each node is labeled with a node name in bold typeface, indicating the type of node. For example, the virtual function 220 is "hosted on" a virtual machine 222, which is "hosted on" a physical machine 224 "deployed on" a rack 226 "located in" data center 228.

Node properties are stored in the dependency graph 200, and are represented in normal typeface in FIG. 2. For example, the virtual machine 222 has a certain number of central processing units (CPUs) and a certain amount of memory. Attributes of each node are also stored in the dependency graph 200, and are represented in italic typeface in FIG. 2. For example, the graph 200 may store IP addresses of the virtual machine 222.

Figure 3:
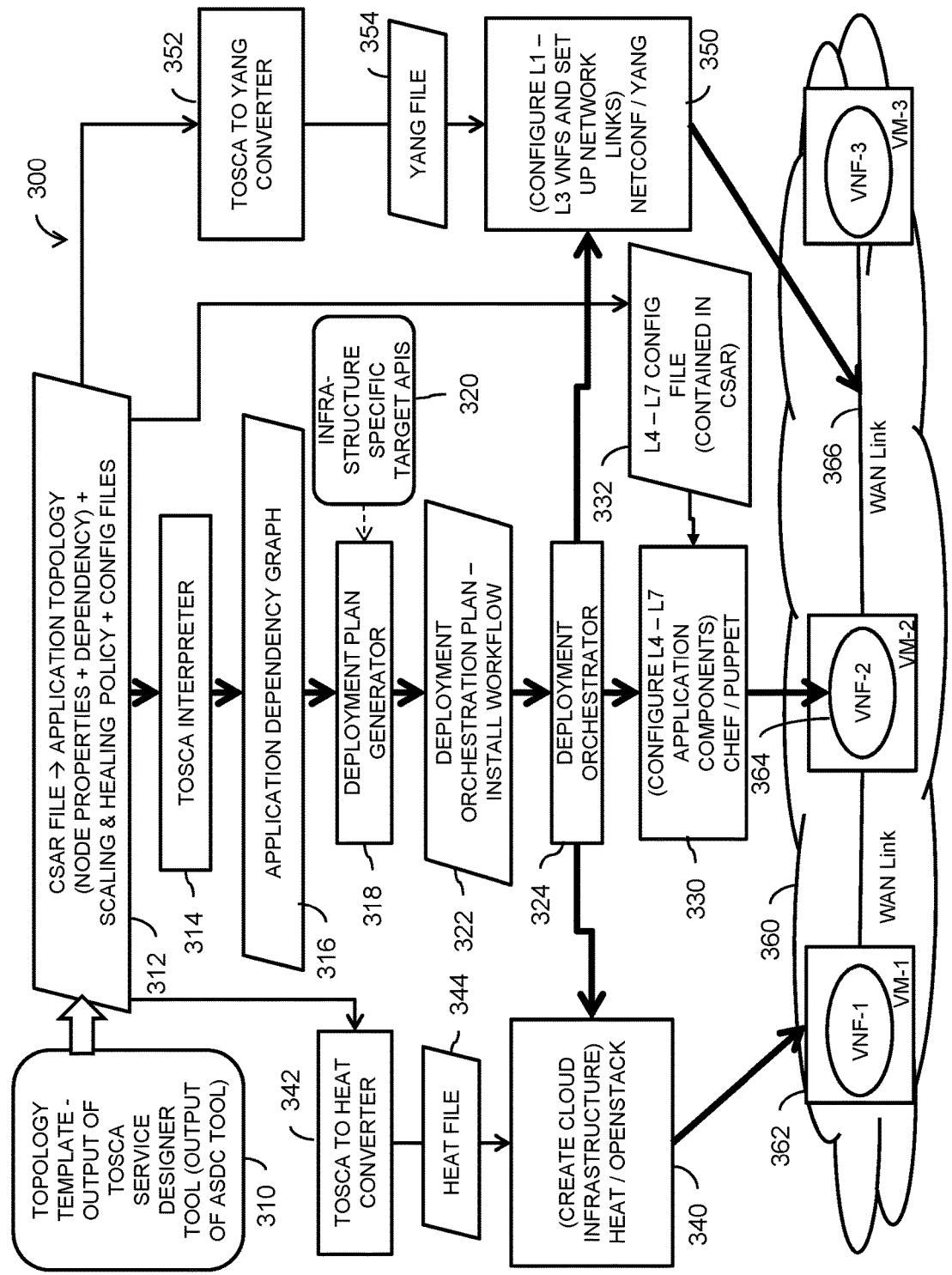
FIG. 3 is a block diagram showing the generation of cloud deployment templates from a TOSCA model in accordance with aspects of the present disclosure.

A block diagram 300 shown in FIG. 3 is an illustration of a set of tools used in deploying services according to the disclosure, and of the artifacts generated from those tools. A service design and creation tool (such as a TOSCA service designed tool) includes a set of tools that produces artifacts that are consumed by different components of a cloud automation framework. The first artifact created is the application's topology model 310, as a result of service composition activity. That artifact is then input to various tool sets, as shown in FIG. 3, to generate multiple other artifacts.

Specifically, the artifacts include application topology (node properties plus dependency), scaling and healing policy, and config files. The artifacts are packaged together in an archive file called a Cloud Services Archive (CSAR) file 312. The CSAR file 312 is processed by a TOSCA interpreter 314 to produce an application dependency graph (A-DG) 316. A deployment plan generator tool uses the A-DG, together with infrastructure specific target APIs 320, to produce a deployment orchestration plan—install workflow script 322. That script 322 is executed on a deployment orchestrator execution engine 324 to create and configure various components of a cloud service 360 as follows.

The deployment orchestrator 324 orchestrates the creation of the required cloud infrastructure by an engine 340. The engine 340 processes a HEAT file 344 created by a TOSCAto-HEAT converter 342 to create cloud infrastructure such as the virtual machine 362. In particular, the engine 340 performs the following:
Create VMs.
Install OS on VMs.
Create User/Home directories.
Assign IP Address to VMs.
Create Security Groups.
Create vNICs, and Assign VLAN IDs.
Create and Attach Storage to VM.
Stitch VMs to vNICs, vNICs to host machine pNICs and to Data Center Switches.

The deployment orchestrator 324 additionally orchestrates the configuration of L1-L3 virtual network functions (VNFs) and the setting-up of network links by an engine 350. The engine 350 uses a YANG file 354 created by a TOSCA-to-YANG converter 352 to create connections and links such as the WAN link 366. The engine 350 performs the following operations:
Configure L1-L3 VNFs (YANG).
Set up ROUTE between VNFs/VMs located in different DATA CENTERS.
Configure ROUTE Bandwidth.
Configure ROUTE CoS parameters.

The deployment orchestrator 324 also orchestrates the configuration of L4-L7 application components by an engine 330. The engine 330 uses an L4-L7 CONFIG file 332 contained in the CSAR file 312 to create applications such as the virtual network function 364. The engine 330 performs these operations to bring the application to a state of operational readiness:
Install L1-L3/L4-L7 VNFs on VMs.
Configure L4-L7 App Components.
Start L4-L7 App Components.

Figure 4:
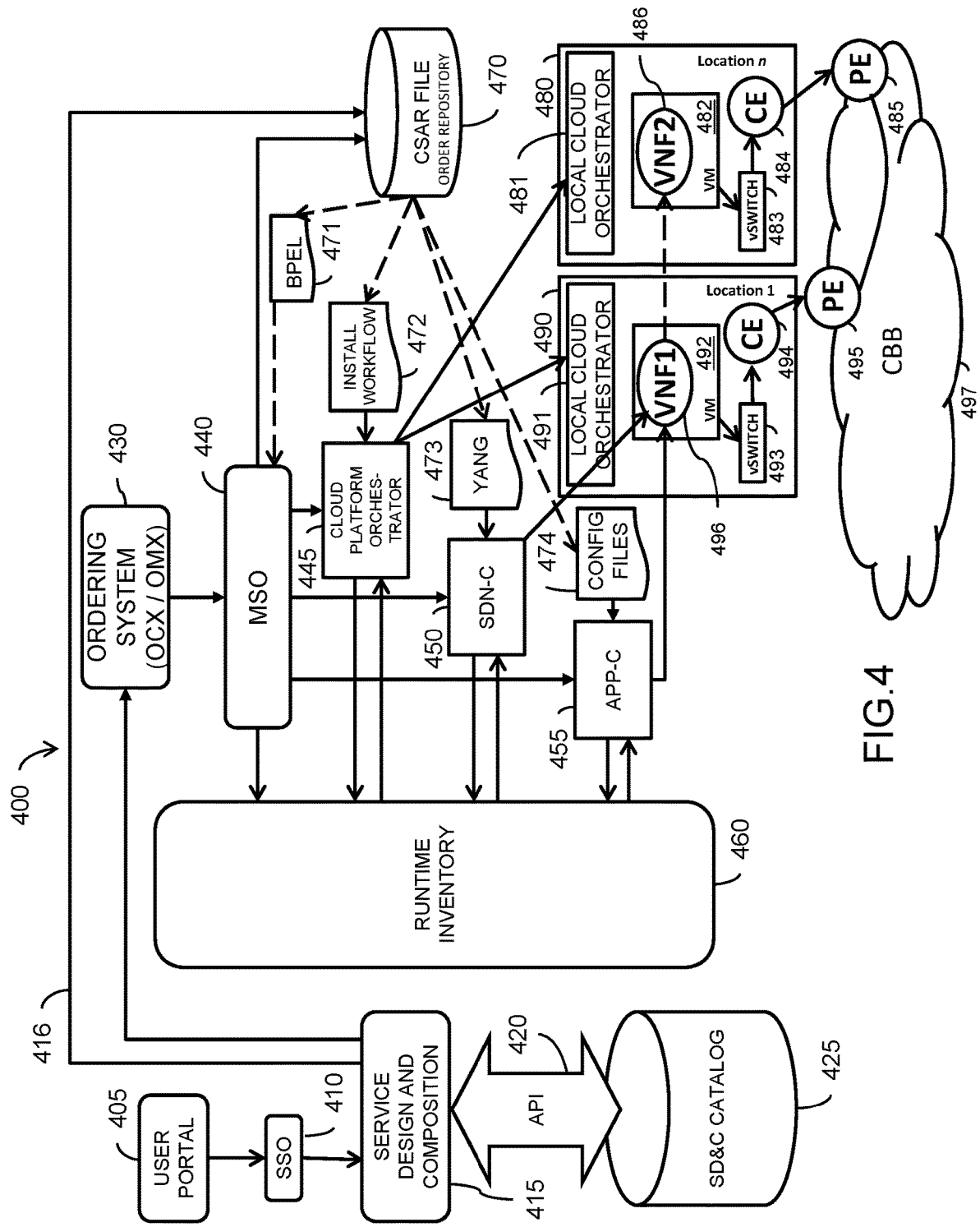
FIG. 4 is a block diagram showing elements and interactions in accordance with aspects of the present disclosure.

A TOSCA-based cloud application deployment in a network operator's cloud automation framework such as AT&T's ECOMP framework is illustrated in the interaction sequence diagram 400 of FIG. 4. The following describes, with reference to FIG. 4, a technique of deploying the TOSCA specified application topology in accordance with embodiments of the disclosure. The sequence of interactions occurs within the cloud automation operations management framework in order to deploy a composite service/application in a cloud platform.

A user accesses a service design and creation tool 415 such as the ASDC tool using a Web user interface/portal 405 to design a composite application. The portal 405 may access the multiple tools used in the framework using a single sign-on access 410.

The service designer tool 415 re-uses (pulls) the predefined resources, services, and products, described in TOSCA, from a service design and composition catalog 425 in order to construct a composite service/application. An API 420 may be used to retrieve the resource catalog. The Service Designer 415 assigns deployment policies, such as healing and scaling policies and the configuration files for the application components—the TOSCA node types.

The service designer 415 validates the composite design and produces a topology template of the composite service/application. The topology template comprises the following artifacts:
Node types—correspond to application components (VNF—controllers (VNFCs)), the containers (VMs) they are hosted in, etc.
Node lifecycle interfaces—are operations to create, configure, and start the application components and the containers (VMs) they are hosted in.
Node relationships—define the connectivity and nature of dependency between applications components.
Healing and Scaling Policies—are associated with the node templates. Those policies describe the application's KPIs and what actions need to be taken when those KPIs are violated. For example, if the number of incoming requests to an application component increases over a certain threshold (trigger), then the policy may require creating another VM, deploying the application component on that VM, and load balancing the traffic between the application components.
Configuration Files—are the configurations that are applied to the applications components after deployment and before startup.

The services design and composition tool set then produces multiple artifacts packaged in a cloud services archive (CSAR) file and stored in the customer order repository 470. Each CSAR file is identified by a unique order ID corresponding to a particular customer requested service.

The customer then submits the order to ordering system/internal workflow system 430 (OCX/OMX). Specifically, after the completed design is validated and the necessary artifacts described above have been generated and stored in the order repository 470, the service design and composition tool 415 sends the order ID of the completed/validated order to the OCX/OMX.

The ordering system 430 then triggers a master service orchestrator 440 (MSO) to start the provisioning process. To do that, the ordering system 430 calls the MSO, passing in the order ID. That begins the deployment of the application topology on the cloud infrastructure.

The MSO 440 then retrieves the CSAR file from the order repository 470 using the order ID as a key. The MSO extracts the install workflow file 471, such as a BPEL workflow file, from the CSAR archive, and uses it to orchestrate three controllers: (1) a cloud platform orchestrator 445, (2) a SDN-C 450, and (3) an APP-C 455. The install workflow file may be a business process execution (BPEL) file.

MSO also retrieves the A-DG file from the CSAR archive and stores it in a runtime inventory 460, indexed with the order ID. This is the first time a dependency graph of the customer's requested service is stored in runtime inventory.

The MSO 440 calls the cloud platform orchestrator 445 to create the cloud infrastructure (VMs, Subnets, vNICs, etc.) and to install (deploy) the service/application components on the VMs. To initiate this, the MSO 440 passes the order ID to the cloud platform orchestrator 445. The cloud platform orchestrator then retrieves the TOSCA CSAR file from the order repository 470 using the order ID as the key, and extracts the HEAT orchestration template (HOT) 472 from the CSAR file. The cloud platform orchestrator then determines what cloud resources must be created and where those resources must be created, i.e., which data centers, based on the application component location attribute specified in A-DG. The components of the composite application must be created in appropriate data centers (and in the correct availability zones within the data center) based on the location attribute specified in the A-DG.

The cloud platform orchestrator 445 calls the runtime inventory 460 to check if the required cloud resources are available. Specifically, the cloud platform orchestrator checks if the required type and quantity of resources are available in the cloud network in the desired data centers.

The cloud platform orchestrator then calls the local cloud orchestrators 481, 491 in the data centers 480, 490 to create cloud resources. The local cloud orchestrators are responsible for the following VM setup functions:

Creates VMs 482, 492 of the required CPU and memory.
Attaches disk storage to the VMs.
Installs the requested OS on the VMs.
Creates users and home directories for users.
Assigns public and private IP addresses to the VMs.
Creates and associates the firewall rules (security groups) to the VMs.
Assigns vNICs and local VLAN IDs to the VMs.
Connects the VLANs to the local data center switch 483, 493 and CPE 484, 494. The CPEs/networking gear in the data center is pre-connected to the PE-routers 485, 495 of the common backbone (CBB) network 497.
Downloads and install the application components (L1-L3 and L4-L7) or their Docker Images from the appropriate GitHub Repositories.
Set-up/configure the ports required by the application(s) that would run in the VM (such as the external web port, DB Port, etc.), required by the application/VNF to talk to the backend DB Server (hosted in another VM).

This results in the setting up of the VMs, the installations of VNFs (application components) on the VMs and the connectivity between the VNFs across the different data centers.

What remains is to set up is the ROUTE between VMs (and hence VNFs hosted in them) on the WAN links between the data centers, to assure that the connectivity (WAN link) between the VNFs meets the application requirements such as bandwidth, latency, and other network CoS guarantees, and to configure the installed VNFs with properties to bring them to a state of operational readiness.

The cloud platform orchestrator 445 then calls the runtime inventory 460 to update the A-DG to reflect the current cloud state, including node properties. That brings the A-DG to reflect the latest state that exists in the cloud. The cloud platform orchestrator 445 then confirms that it has completed its job to the MSO 440.

The MSO 440 then calls SDN-C 450 to configure the L1-L3 VNFs and to set up the route and the required network guarantees on the network links between the newly created remote VMs on the WAN (CBB). In particular, the MSO 440 passes the order ID to the SDN-C 450, the SDN-C retrieves the CSAR File using the order ID as the key from order repository 470, the SDN-C extracts the YANG scripts 473 from the CSAR files, and the SDN-C inspects the YANG scripts to find out the required resources and the order in which to configure the resources.

SDN-C 450 then calls the runtime inventory 460 to check if the required networking resources, such as the bandwidth, throughput, CoS guarantees, etc., are available on the WAN links.

If the required resources are available, then SDN-C 450 then performs the following functions to configure the network and set up routes between the remote VMs:

The SDN-C configures the L1-L3 VNFs using the YANG scripts 473 over Netconf protocol.
SDN-C sets up the ROUTE between the remote VMs 482, 492; i.e., those hosted in different data centers 480, 490.
SDN-C then configures the required bandwidth, latency and CoS characteristics on the route (network links) between the remote VMs/VNFs.

With respect to the connectivity between VNFs, that connectivity is established when the VMs are stitched to the data center switches/CPEs by the cloud orchestrator. The data centers 480, 490 are already connected via the WAN 497.

The A-DG graph in the runtime inventory 460 is then updated by the SDN-C 450. In particular, the following operations are performed:

Appends the "VM" node with the "WAN link" node.
Updates "WAN link" node properties—such as route identifier, bandwidth, throughput and CoS data.

That brings the A-DG to reflect latest state that exists in the network. The SDN-C 450 then confirms to the MSO 440 that it has completed its job.

If the application being deployed contains L4-L7 application components (such as a Trinity™ app server, a session border controller, DNS, etc.), then the MSO 440 calls the APP-C 455 to configure, setup, and start the application components.

The APP-C retrieves the A-DG from the runtime inventory, in order to find the dependency between application components, which is used to determine the sequence in which the components are configured.

The APP-C 455 is a configuration management and monitoring tool that configures and starts the application components. It hosts plugins for tools such as Chef™, Puppet™, Tacker™, etc. Based on the application component dependencies specified in the A-DG, the APP-C calls each component in sequence to:

Configure the L4-L7 application component.
Start the L4-L7 application component.

APP-C also monitors the KPIs and application performance management (APM) indicators of the L4-L7 application components.

The APP-C 455 then updates the A-DG in the runtime inventory 460. Specifically, the "VNF Node" properties are updated as "configured" and "started," bringing the A-DG to reflect the latest state that exists in the application. Also, the APPC 455 notifies the MSO 440 that it has completed its job. That brings the entire application to a state of operational readiness.

Figure 5:
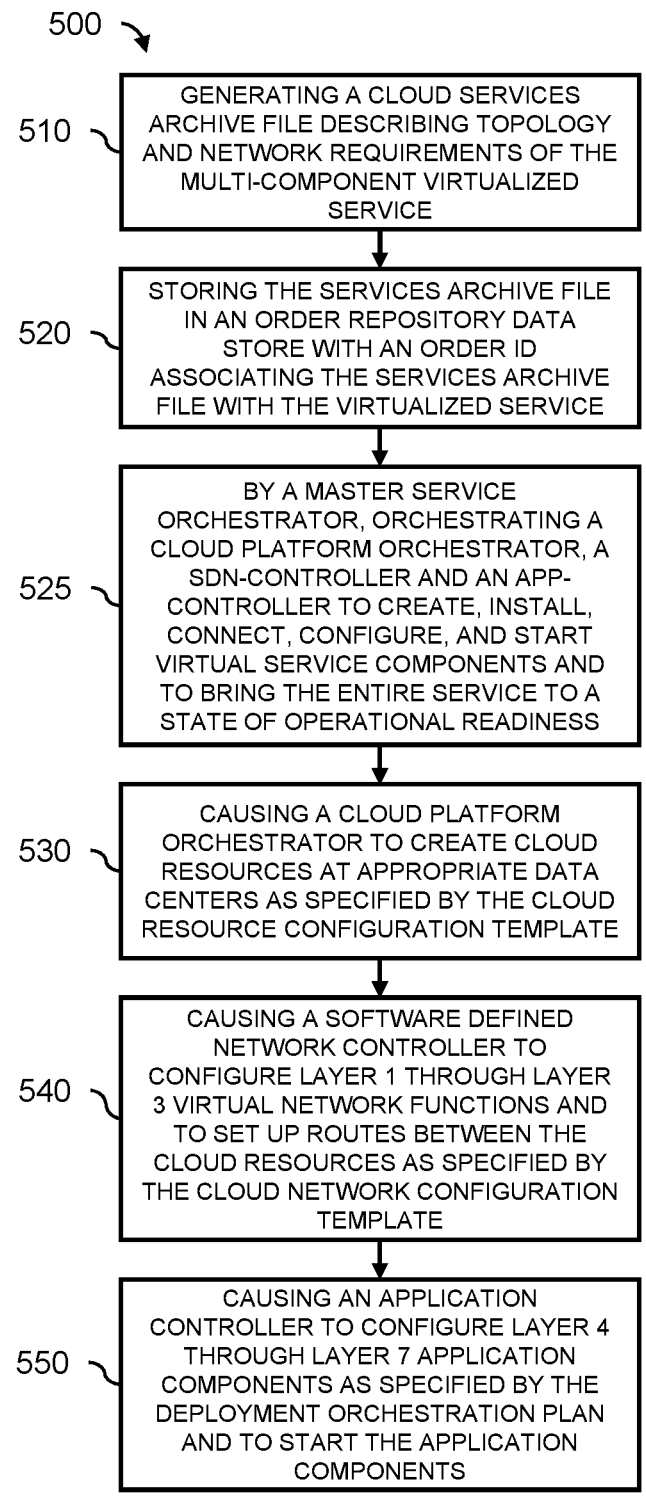
FIG. 5 is a flow diagram showing a method in accordance with aspects of the present disclosure.

A method for provisioning a virtualized service in a cloud infrastructure, in accordance with embodiments of the disclosure, will now be described with reference to the block diagram 500 of FIG. 5. A cloud services archive file such as a CSAR file is initially generated at operation 510. The services archive file describes topology and network requirements of the virtualized service. The services archive file is stored at operation 520 in an order repository data store with an order ID associating the services archive file with the virtualized service.

A master service orchestrator then orchestrates (operation 525) a cloud platform orchestrator, a software defined network controller and an application controller to create, install, connect, configure, and start virtual service components and to bring the entire service to a state of operational readiness. The master service orchestrator transmits cloud resource configuration instructions including the order ID to cause the cloud platform orchestrator to retrieve the cloud services archive file from the order repository data store using the order ID, and to extract a cloud resource configuration template from the cloud services archive file. The cloud platform orchestrator is then caused to create (operation 530) cloud resources at appropriate data centers as specified by the cloud resource configuration template.

The master service orchestrator also transmits cloud network configuration instructions including the order ID to cause the software defined network controller to retrieve the cloud services archive file from the order repository data store using the order ID, and to extract a cloud network configuration template from the cloud services archive file. The software defined network controller is then caused (operation 540) to configure layer I through layer 3 virtual network functions and to set up routes between the cloud resources as specified by the cloud network configuration template.

The master service orchestrator additionally transmits deployment orchestration instructions including the order ID to cause the application controller to retrieve the cloud services archive file from the order repository data store using the order ID, and to extract a deployment orchestration plan from the cloud services archive file. The application controller is caused (operation 550) to configure layer 4 through layer 7 application components as specified by the deployment orchestration plan and to start the application components.

The hardware and the various network elements used in implementing the above-described processes and systems comprise one or more processors, together with input/output capability and computer readable storage devices having computer readable instructions stored thereon that, when executed by the processors, cause the processors to perform various operations. The processors may be dedicated processors, or may be mainframe computers, desktop or laptop computers or any other device or group of devices capable of processing data. The processors are configured using software according to the present disclosure.

Each of the hardware elements also includes memory that functions as a data memory that stores data used during execution of programs in the processors, and is also used as a program work area. The memory may also function as a program memory for storing a program executed in the processors. The program may reside on any tangible, non-volatile computer-readable storage device as computer readable instructions stored thereon for execution by the processor to perform the operations.

Generally, the processors are configured with program modules that include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like, and may employ a distributed computing environment, where tasks are performed by remote processing devices that are linked through a communications network. In a distributed computing environment, modules may be located in both local and remote memory storage devices.

An exemplary processing module for implementing the methodology above may be stored in a separate memory that is read into a main memory of a processor or a plurality of processors from a computer readable storage device such as a ROM or other type of hard magnetic drive, optical storage, tape or flash memory. In the case of a program stored in a memory media, execution of sequences of instructions in the module causes the processor to perform the process operations described herein. The embodiments of the present disclosure are not limited to any specific combination of hardware and software.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. The terms "tangible media" and "non-transitory media" each exclude transitory signals such as propagated signals, which are not tangible and are not non-transitory. Cached information is considered to be stored on a computer-readable medium. Common expedients of computer-readable media are well-known in the art and need not be described in detail here.

Cloud based applications are a key to network computing in the next decade, and the cloud platforms on which they are deployed are already geared towards hosting a large number of applications of diverse types. A key to the customer satisfaction is how fast those applications can be deployed and how accurately they meet the deployment requirements specified in the blueprints.

Each cloud application, however, is different—different component types and different topology (dependencies) between them. Current deployment practices include manually developing the deployment plans and then going through a testing phase before their use. This is a long and cumbersome process and is a barrier to the fast and accurate deployment of thousands of customer applications that must be deployed on commercial clouds. The disclosed system extracts the benefits of TOSCA and provides a model driven approach in the context of a closed loop automation system.

In the presently disclosed system, the generation of a deployment orchestration plan directly from the application topology model assures that the deployment plan meets the deployment requirements, and permits cloud applications to be deployed fast and in an automated manner. The automation of the deployment process results in cost savings.

The forgoing detailed description is to be understood as being in every respect illustrative and exemplary, but not restrictive, and the scope of the disclosure herein is not to be determined from the description, but rather from the claims as interpreted according to the full breadth permitted by the patent laws. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. It is to be understood that various modifications will be implemented by those skilled in the art, without departing from the scope and spirit of the disclosure.

What is claimed is:

1. A system, comprising:
   a processing system including a processor; and
   a memory that stores executable instructions that, when executed by the processing system, facilitate performance of operations, the operations comprising:
   transmitting cloud resource configuration instructions to a cloud platform orchestrator of a master service orchestrator to cause the cloud platform orchestrator to retrieve from an order repository data store, a cloud services archive file describing topology and network requirements of a virtualized service in a cloud infrastructure, to extract a cloud resource configuration template from the cloud services archive file, and to create cloud resources at appropriate data centers as specified by the cloud resource configuration template;

transmitting cloud network configuration instructions to a software defined network controller to cause the software defined network controller to retrieve the cloud services archive file from the order repository data store, to extract a cloud network configuration template from the cloud services archive file and to configure the cloud resources as specified by the cloud network configuration template;

transmitting deployment orchestration instructions to an application controller to cause the application controller to retrieve the cloud services archive file from the order repository data store, to extract a deployment orchestration plan from the cloud services archive file and to configure application components as specified by the deployment orchestration plan; and obtaining application dependency information generated from the cloud services archive file and describing the virtualized service, wherein the application dependency information is stored in a runtime inventory data store reflecting a latest state of the cloud infrastructure, and wherein the application dependency information is updated by the cloud platform orchestrator to the latest state of the cloud infrastructure after a creating the cloud resources at the appropriate data centers.

2. The system of claim 1, wherein the cloud services archive file is generated via a cloud service designer tool, and wherein the runtime inventory data store further comprises an interface with the master service orchestrator for receiving the application dependency information as generated by the cloud service designer tool.

3. The system of claim 1, wherein application dependency information comprises a graph.

4. The system of claim 1, wherein the application dependency information updated after configuring layer 1 through layer 3 virtual network functions.

5. The system of claim 4, wherein the runtime inventory data store further comprises an interface with the application controller for transmitting the application dependency information as updated by the software defined network controller, and for updating the application dependency information after configuring and starting layer 4 through layer 7 application components.

6. The system of claim 5, wherein the deployment orchestration instructions further cause the application controller to determine dependency relationships among the layer 4 through layer 7 application components from the application dependency information, and to configure the layer 4 through layer 7 application components in a sequence based on the dependency relationships.

7. The system of claim 1, wherein the creating the cloud resources at the appropriate data centers further includes assigning vNIC and local VLAN IDs of VLANS to virtual machines and connecting the VLANS to a local data center switch.

8. The system of claim 1, wherein the cloud network configuration instructions further cause the software defined network controller to configure bandwidth, latency and class of service characteristics as specified by the cloud network configuration template on routes set up between the cloud resources.

9. The system of claim 1, wherein the cloud services archive file is generated via a cloud service designer tool, and wherein the order repository data store further comprises an interface with the cloud service designer tool for receiving the cloud services archive file.

10. The system of claim 1, wherein the cloud services archive file is generated via a cloud service designer tool, and wherein the cloud service designer tool utilizes a TOSCA™ topology and orchestration specification, the cloud resource configuration template is a YANG™ file created from output of the cloud service designer tool, and the cloud network configuration template is a HEAT™ file created from output of the cloud service designer tool.

11. A method, comprising:

providing, by a processing system including a processor, cloud resource configuration instructions to cause a cloud platform orchestrator to retrieve, from an order repository data store, a cloud services archive file describing topology and network requirements of a virtualized service in a cloud infrastructure, to extract a cloud resource configuration template from the cloud services archive file, and to create cloud resources at appropriate data centers as specified by the cloud resource configuration template;

providing, by the processing system, cloud network configuration instructions to cause a software defined network controller to retrieve the cloud services archive file from the order repository data store, to extract a cloud network configuration template from the cloud services archive file and to configure the cloud resources as specified by the cloud network configuration template;

providing, by the processing system, deployment orchestration instructions to cause an application controller to retrieve the cloud services archive file from the order repository data store, to extract a deployment orchestration plan from the cloud services archive file and to configure application components as specified by the deployment orchestration plan; and extracting, by the processing system, application dependency information from the cloud services archive file, the application dependency information describing the virtualized service, wherein the application dependency information is stored in a runtime inventory data store reflecting a latest state of the cloud infrastructure, and wherein the cloud platform orchestrator is further caused to update the application dependency information to the latest state of the cloud infrastructure after a creating the cloud resources at the appropriate data centers by the cloud platform orchestrator.

12. The method of claim 11, wherein the application dependency information comprises a graph.

13. The method of claim 11, wherein a configuring of the cloud resources as specified by the cloud network configuration template further comprises configuring layer 1 through layer 3 virtual network functions.

14. The method of claim 13, wherein the software defined network controller is further caused to update the application dependency information after configuring the layer 1 through layer 3 virtual network functions.

15. The method of claim 14, wherein the application controller is further caused to determine dependencies among the cloud resources using the application dependency information as updated by the software defined network controller, and wherein the application controller is further caused to update the application dependency information after configuring and starting the layer 4 through layer 7 application components.

16. A non-transitory machine-readable storage medium comprising executable instructions that, when executed by a processing system including a processor, facilitate performance of operations, the operations comprising:

providing cloud resource configuration instructions to cause a cloud platform orchestrator to retrieve, from an order repository data store, a cloud services archive file describing topology and network requirements of a virtualized service in a cloud infrastructure, to extract a cloud resource configuration template from the cloud services archive file, and to create cloud resources at appropriate data centers as specified by the cloud resource configuration template;

providing cloud network configuration instructions to cause a software defined network controller to retrieve the cloud services archive file from the order repository data store, to extract a cloud network configuration template from the cloud services archive file and to configure the cloud resources as specified by the cloud network configuration template;

providing deployment orchestration instructions to cause an application controller to retrieve the cloud services archive file from the order repository data store, to extract a deployment orchestration plan from the cloud services archive file and to configure application components as specified by the deployment orchestration plan; and obtaining application dependency information from the cloud services archive file, the application dependency information describing the virtualized service, wherein the application dependency information is stored in a runtime inventory data store reflecting a latest state of the cloud infrastructure, and wherein the cloud platform orchestrator is further caused to update the application dependency information to the latest state of the cloud infrastructure after a creating the cloud resources at the appropriate data centers by the cloud platform orchestrator.

17. The non-transitory machine-readable storage medium of claim 16, wherein the application dependency information comprises a graph.

18. The non-transitory machine-readable storage medium of claim 16, wherein the application dependency information comprises an application dependency graph.

19. The non-transitory machine-readable storage medium of claim 18, wherein the software defined network controller is further caused to update the application dependency graph after configuring layer 1 through layer 3 virtual network functions.

20. The non-transitory machine-readable storage medium of claim 18, wherein the application controller is further caused to determine dependencies among the cloud resources using the application dependency graph as updated by the software defined network controller, and wherein the application controller is further caused to update the application dependency graph after configuring and starting layer 4 through layer 7 application components.

* * * * *